3,104,205
DEODORANT COMPOSITION COMPRISING THE COPPER COMPLEX OF THE COPOLYMER OF ALLYLAMINE AND METHACRYLIC ACID
Raymond M. Hainer, Lexington, Mass., and Murray Berdick, Scarsdale, and Herbert Morawetz, New York, N.Y., assignors, by mesne assignments, to Warner-Lambert Pharmaceutical Company, Wilmington, Del., a corporation of Delaware
No Drawing. Filed Dec. 17, 1959, Ser. No. 860,101
6 Claims. (Cl. 167—93)

We have discovered that a substantial factor in the deodorization power of chlorophyll and chlorophyllin, as for example, potassium-sodium-copper chlorophyllin, is due to the content of a copper complex. It is the object of the present invention to provide a deodorant composition which will contain a copper complex, which will possess a deodorizing power substantially superior to chlorophyll and the copper salts of chlorophyll, and which composition will have a high molecular weight retarding transfer from the digestive tract membranes into the blood stream. A molecular weight of the uncoppered complex above about 10,000 meets this condition. The effectiveness as a deodorant is independent of the molecular weight.

The characteristic of the present invention is the provision of a coppered allylamine-methacrylic acid copolymer which will have a deodorizing effect greatly superior to copper chlorophyllin of equal weight. This application is a continuation-in-part of our application filed September 19, 1957, Serial No. 684,867, now forfeited.

As an example, our initial copolymer complex may be prepared by polymerization of methacrylic acid in the presence of ionized allylamine.

A solution containing 129 grams of distilled methacrylic acid
85.5 grams of distilled allylamine
2.25 grams of potassium persulfate in 900 millimeters of water was adjusted to pH 7.0 to 7.1, degassed, and heated for eighteen hours at 60° C. The solution was slowly decanted, with stirring, into 4 liters of isopropyl alcohol, and a white gummy precipitate formed. The precipitate was separated by decantation and redissolved in 1 liter of distilled water. The solution was dialyzed against 3 1600 ml. changes of distilled water each for a 3 hour period. The contents of the dialysis bag was concentrated under vacuum to the original volume. The polymer solution was then dialyzed against two additional 1600 ml. changes of distilled water each for a two hour period.

As a precaution in order to remove traces of amines, a 20% solution of the copolymer was adjusted to pH 9.16 using sufficient sodium hydroxide, for example, for said result, this solution was vacuum distilled until the distillate was substantially neutral.

A sample of the copolymer, in which the amounts of the monomers are approximately equimolar, was freeze-dried and characterized by viscosity determinations. The viscometer was a Ubbelhode-type dilution viscometer with an efflux time for water of 195 seconds. Measurements were made at $25.00 \pm 0.003°$ C. The solvent employed was 1 N sodium hydroxide to suppress the polyelectrolyte effect. The molecular weight of the copolymer was above 10,000, and the intrinsic viscosity was 0.56, the degree of viscosity however not being essential or critical to the practice of the invention.

Mutual interaction of electrostatic forces between ions attached to the polymer chain and the counter ions that maintain electrical neutrality create important differences in behavior between polyelectrolytes and other types of molecules. Such binding is not a function of how long the chain is, because the binding is a fairly local matter, not influenced by what is on the chain 200 or 1000 atoms away.

The above facts are confirmed by investigations that have been recorded on the effect of molecular weight. For example, Kern (Kern, W. Z., Physik. Chem., (A) 181, 249 (1938)), found that at a fixed extent of ionization and at a fixed equivalent concentration of the acid, the pH of the solution was independent of the molecular weight of the sample of polyacrylic acid, over a wide range of molecular weight. The lack of dependence of the pH on the molecular weight of the sample was verified for polymethacrylic acid by Katchalsky and Spitnik (Katchalsky, A., and Spitnik, P., J. Polymer Sci., 2, 342 (1947)), and Arnold and Overbeck (Arnold, R., and Overbeck, J. T. G., Rec. trav. chim., 69, 192 (1950)). Ferry and coworkers (Ferry, J. D., et al., J. Colloid Sci., 6, 429 (1951)), studied the titration behavior of a polyelectrolyte made by copolymerizing styrene and maleic anhydride. Their results agreed for samples of different molecular weight.

In studies of conductivity, Kern found that with aqueous solutions of polyacrylic acid, the equivalent conductance is insensitive to degree of polymerization (i.e., molecular weight). Furthermore, with partially neutralized polyacrylic acid, Kern found that the equivalent conductance is independent of molecular weight.

In a study of the interactions of polyelectrolytes and serum albumin, Morawetz and Hughes (Morawetz, H., and Hughes, W. L., Jr., J. Phys, Chem. 56, 64 (1952)), demonstrated that the interaction behavior was independent of molecular weight of the polyelectrolyte.

These examples from the literature affirm that with respect to behavior involving interactions and binding of other molecules, polyelectrolytes act independently of molecular weight. However, the special condition of a molecular weight of above about 10,000 present in our deodorant composition is for retarding transfer from the digestive tract membrane into the blood stream.

As an operative example, a 150 ml. sample of the alkali-treated copolymer solution, pH 7.21, containing 12 grams of polymer was dialyzed for 24 hours against 900 ml. of a cupric acetate solution, pH 5.72, containing 1.25 grams of copper. During the dialysis there was some precipitation from the inside solution. This solution with precipitate was concentrated under vacuum to about 250 ml. and then dialyzed for 36 hours against a number of distilled water changes until the outside solution contained less than one microgram of copper per ml. The coppered polymer solution was again concentrated under vacuum to about 250 ml. and freeze-dried. The product obtained was an odorless fluffy blue solid.

A sample of this polymer was analyzed for copper and nitrogen. The copper content determined microanalytically was 7.6%; determined by electro-deposition was 7.6%. The nitrogen content (average of 2 microanalytical determinations) was 4.5%.

This specific example was prepared by a method which is generally applicable to carboxylic monomers which can be used instead of methacrylic acid. Other copolymers can be prepared by polymerization of acidic monomers in the presence of ionized allylamine. These copolymers can form copper complexes which are also effective deodorants. Examples of other monomers which can be used in place of methacrylic acid are acrylic acid, crotonic acid, maleic anhydride, etc.

The following tests establish the deodorizing utility of our copolymer:

TITRILOG TEST

A solution of the copper copolymer complex was added to a solution of propyl mercaptan, which is a major constituent of onion odor, and was mixed for one minute in a closed polyethylene bag. The vapors in the bag were transferred directly and quantitatively to the reaction cell of the titrilog, in order to measure by automatic titration with bromine the residual concentration of odoriferous mercaptan. Similar measurements were made using as a deodorant potassium sodium copper chlorophyllin in place of the copper copolymer complex. Samples of 0.7 mg. of the copper copolymer complex were equivalent in this titration to 4 mg. of the standard potassium sodium copper chlorophyllin, both of these copper-containing materials reacting with 0.2 mg. of propyl mercaptan.

THERMAL CONDUCTIVITY CELL TEST

The tests were carried out by bubbling propyl mercaptan vapor through 0.25% solutions of copper copolymer complex using helium as a carrier gas. Detection of unreacted propyl mercaptan passing through these solutions was made by a thermal conductivity cell. The extent of reaction obtained was from a calculation based on a curve of cell E.M.F. vs. time obtained with an associated automatic recorder. The measurements were compared with those from similar tests using 0.25% solutions of sodium potassium copper chlorophyll in place of the copper copolymer. The results showed that the copper copolymer complex was four to five times as effective as an equal quantity of sodium potassium copper chlorophyllin under the conditions of this test.

BEAKER TEST

A series of graded amounts of copper copolymer complex and of sodium potassium copper chlorophyllin were separately added to approximately 1% solutions of onion juice. The odors from these solutions were evaluated by a panel of judges. The results showed that 0.7 mg. of the copper copolymer complex gave a deodorizing effect equivalent to that given by 4 mg. of the standard sodium potassium copper chlorophyllin.

PANEL TEST

A solution of 0.02% onion oil was used to contaminate the mouths of a panel of subjects. Candy tablets containing equal proportions of either the copper copolymer complex or sodium potassium copper chlorophyllin were given to the subjects to dissolve in the mouth. The intensity of onion odor on the breath of each subject was subjectively evaluated by olfaction at specified intervals of time. As controls, some subjects chosen at random were given candy tablets without a deodorant, and some were not given any tablets. The results showed that 0.07 mg. of the copper copolymer complex and 4 mg. of the sodium potassium copper chlorophyllin gave equivalent progressive odor reduction measured at 1, 10, 30 and 60 minutes after the tablet was given. Where the carrier composition is to be dissolved in the mouth, as in the case of candy tablets, we prefer to incorporate about 0.075 mg. of the copper copolymer complex per tablet. Such a low dosage will avoid any danger of toxic reactions, while still providing effective deodorization. Where, however, the carrier is not to be swallowed, as in the case of mouth wash, increased deodorant effect can be obtained by using greater amounts of the copper polymer complex.

The following examples of deodorant compositions of our invention illustrate the widely divergent novel products that may be obtained therefrom. Where the ingredient "glyceride" is listed, this is any suitable glyceride fat or oil preferably of particle size below 5 microns, the weight being on a dry fat basis.

Example 1

A deodorant candy tablet having the following composition:

| | | |
|---|---|---|
| Sugar | gms | 957 |
| Glucose | gms | 31.8 |
| Glyceride | gms | 4.1 |
| Copper copolymer complex | gm | 0.049 |
| Flavor | gms | 4.00 |
| Magnesium stearate | gms | 2.86 |
| Total | gms | 1,000.00 |
| Tablet weight | gms | 1.53 |
| Dose of copper copolymer complex per tablet | mg | 0.075 |

Example 2

The following deodorant candy coated chewing gum:

Gum centers—

| | | |
|---|---|---|
| Gum base | gms | 110 |
| Sugar | gms | 340 |
| Corn syrup | gms | 110 |
| Flavor | gms | 5 |

Coating—

| | | |
|---|---|---|
| Sugar | gms | 427 |
| Flavor | gms | 5 |
| Copper copolymer complex | gm | 0.043 |
| Glyceride | gms | 3.5 |
| Total | gms | 1,000 |
| Weight per piece | gms | 1.75 |
| Dose of copper copolymer complex | mg | 0.075 |

While the glyceride in the above and subsequent formulas provides a supplementary deodorant factor, it is not necessary to the operativeness of the copper copolymer complex.

Example 3

A mouth wash deodorant having the following composition:

| | | |
|---|---|---|
| Boric acid | gms | 2.5 |
| Benzoic acid | gm | 0.1 |
| Glycerine | gms | 2.0 |
| Specially denatured alcohol | cc | 25.0 |
| Copper copolymer complex | mg | 0.375 |
| Glyceride | gm | 0.031 |
| Distilled water, q.s | cc | 100.0 |

On the basis of 20.0 cc. of mouth wash for an average "dose," the dose range for the copper copolymer complex is 0.075 mg.

Example 4

The following toothpaste deodorant:

| | |
|---|---|
| Dicalcium phosphate | 40.0 gms. |
| Glycerine | 20.0 gms. |
| Carboxymethyl cellulose | 0.85 gm. (med. visc.). |
| Sodium lauryl sulfate | 0.80 gm. |
| Heavy mineral oil | 1.00 gm. |
| Soluble saccharin | 0.07 gm. |
| Copper copolymer complex | 7.5 mg. |
| Glyceride | 0.62 gm. |
| Distilled water, q.s | 100.0 cc. |

On the basis of 1.0 g. of toothpaste for an average "dose," the dose range for the copper copolymer complex is 0.075 mg.

*Example 5*

A tooth powder deodorant having the following composition:

| | |
|---|---|
| Calcium carbonate | 50.0 gms. (flow rate 27). |
| Calcium carbonate | 45.0 gms. (flow rate 15). |
| Powdered Castile soap | 4.9 gms. |
| Soluble saccharin | 0.1 gm. |
| Copper copolymer complex | 12.5 mg. |
| Glyceride | 1.0 gm. |

On the basis of 0.6 gram of tooth powder for an average "dose," the dose range for the copper copolymer complex is 0.075 mg.

*Example 6*

The following liquid dentifrice deodorant:

| | | |
|---|---|---|
| Sodium lauryl sulfate | gm | 1.0 |
| Glycerine | gms | 8.0 |
| Soluble saccharin | gm | 0.1 |
| Specially denatured alcohol | cc | 30.0 |
| Methyl cellulose | gm | 0.6 |
| Copper copolymer complex | mg | 15.0 |
| Glyceride | gms | 1.2 |
| Distilled water, q.s. | cc | 100.0 |

On the basis of 0.5 cc. of dentifrice for an average "dose," the dose range for the copper copolymer complex is 0.075 mg.

When the various compositions of Examples 1-6 are employed by human subjects in the usual manner for each type of composition, an excellent deodorant effect is obtained.

Although the present invention has been described with reference to particular embodiments thereof, it is not so limited, but extends to other similar embodiments. Thus the proportion of copper copolymer complex per dosage may range from 0.05 mg. to 4 mg. with effective deodorization and without danger of toxic effect, the larger proportions being applicable to toothpaste and mouth lotions, for example, which are, in the main, not taken internally.

Having described our invention, what we claim and desire to secure by Letters Patent is as follows:

1. An oral deodorant composition comprising the copper complex of a copolymer of approximately equimolar amounts of allylamine and methacrylic acid and having a molecular weight of at least about 10,000, the composition providing an average dose of the complex of not less than about 0.05 mg. and not more than about 4 mg.

2. A deodorant candy tablet comprising a candy tablet containing the copper complex of a copolymer of approximately equimolar amounts of allylamine and methacrylic acid and having a molecular weight of at least about 10,000, the complex being present in an amount of from about 0.05 mg. to about 0.075 mg. per tablet.

3. A deodorant chewing gum unit comprising chewing gum containing the copper complex of a copolymer of approximately equimolar amounts of allylamine and methacrylic acid and having a molecular weight of at least about 10,000, the complex providing a dosage range of from about 0.05 mg. to about 0.075 mg. per chewing gum unit.

4. A mouth wash deodorant comprising a mouth wash containing the copper complex of a copolymer of approximately equimolar amounts of allylamine and methacrylic acid and having a molecular weight of at least about 10,000, the complex being present in an amount to provide an average dose of about 0.05 mg. to about 4 mg. per dose of mouth wash.

5. A toothpaste deodorant comprising a toothpaste containing the copper complex of a copolymer of approximately equimolar amounts of allylamine and methacrylic acid and having a molecular weight of at least about 10,000, the complex being present in an amount to provide an average dose of about 0.05 mg. to about 5 mg. per dose of toothpaste.

6. A tooth powder deodorant comprising a tooth powder containing the copper complex of a copolymer of approximately equimolar amounts of allylamine and methacrylic acid and having a molecular weight of at least about 10,000, the complex being present in an amount to provide an average dose of about 0.05 mg. to about 4 mg. per dose of tooth powder.

No references cited.